(12) United States Patent
Tu et al.

(10) Patent No.: US 11,106,709 B2
(45) Date of Patent: Aug. 31, 2021

(54) RECOMMENDATION METHOD AND DEVICE, A DEVICE FOR FORMULATING RECOMMENDATIONS

(71) Applicant: BEIJING SOGOU TECHNOLOGY DEVELOPMENT CO., LTD., Beijing (CN)

(72) Inventors: Chang Tu, Beijing (CN); Yang Zhang, Beijing (CN); Yanfeng Wang, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 482 days.

(21) Appl. No.: 15/777,375

(22) PCT Filed: Mar. 22, 2016

(86) PCT No.: PCT/CN2016/076978
§ 371 (c)(1),
(2) Date: May 18, 2018

(87) PCT Pub. No.: WO2017/092198
PCT Pub. Date: Jun. 8, 2017

(65) Prior Publication Data
US 2018/0336265 A1   Nov. 22, 2018

(30) Foreign Application Priority Data
Dec. 2, 2015   (CN) .......................... 201510872714.6

(51) Int. Cl.
*G06F 16/00* (2019.01)
*G06F 16/332* (2019.01)
(Continued)

(52) U.S. Cl.
CPC .......... *G06F 16/3323* (2019.01); *G06F 16/00* (2019.01); *G06F 16/338* (2019.01); *G06F 16/3344* (2019.01); *G10L 15/22* (2013.01)

(58) Field of Classification Search
CPC ............. G06F 16/951; G06F 16/24578; G06F 16/3323; G06F 16/00; G06F 16/338;
(Continued)

(56) References Cited

U.S. PATENT DOCUMENTS 8,126,933 B2 * 2/2012 Nishiyama .............. A63F 13/10
707/803
8,650,223 B2 * 2/2014 Wu ......................... H04W 4/02
707/802

(Continued)

FOREIGN PATENT DOCUMENTS

CN    103646089 A    3/2014
CN    104239440 A    12/2014
(Continued)

OTHER PUBLICATIONS

The World Intellectual Property Organization (WIPO) International Search Report for PCT/CN2016/076978 dated Sep. 5, 2016 5 Pages.

*Primary Examiner* — Noosha Arjomandi
(74) *Attorney, Agent, or Firm* — Anova Law Group, PLLC

(57) ABSTRACT

The present disclosure provides a recommendation method and device, and a device for formulating recommendations. The recommendation method specifically includes obtaining a current context of an input method program after the input method program is triggered, analyzing data of past input actions by a current user under past contexts to obtain a target entry matching the current context in the data of the past input actions, and displaying the target entry. The present disclosure provides candidate entries to the user
(Continued)

without any input operation by the user, thereby substantially improving the user's input efficiency.

15 Claims, 5 Drawing Sheets

(51) Int. Cl.
*G06F 16/338* (2019.01)
*G06F 16/33* (2019.01)
*G10L 15/22* (2006.01)

(58) Field of Classification Search
CPC ............ G06F 16/3344; G06F 16/3338; G06F 3/0237; G10L 15/22
See application file for complete search history.

(56) References Cited

U.S. PATENT DOCUMENTS

| | | | | |
|---|---|---|---|---|
| 9,542,532 | B1* | 1/2017 | McNair | G16H 70/20 |
| 9,639,608 | B2* | 5/2017 | Freeman | G06F 16/95 |
| 9,773,284 | B2* | 9/2017 | Huang | G06F 16/9537 |
| 10,687,113 | B2* | 6/2020 | Kegel | H04N 21/25891 |
| 2004/0162890 | A1* | 8/2004 | Ohta | G06F 9/453 |
| | | | | 709/218 |
| 2008/0010258 | A1* | 1/2008 | Sureka | G06F 16/9535 |
| 2008/0082565 | A1* | 4/2008 | Chang | G06Q 30/02 |
| 2008/0167914 | A1* | 7/2008 | Ikeda | G06Q 30/0201 |
| | | | | 705/7.13 |
| 2009/0106040 | A1* | 4/2009 | Jones | G06Q 30/02 |
| | | | | 705/319 |
| 2009/0253112 | A1* | 10/2009 | Cao | G06Q 10/10 |
| | | | | 434/322 |
| 2010/0268661 | A1* | 10/2010 | Levy | G06Q 30/02 |
| | | | | 705/347 |
| 2010/0315674 | A1* | 12/2010 | Shimizu | G06F 3/1258 |
| | | | | 358/1.15 |
| 2011/0112994 | A1* | 5/2011 | Goto | G06Q 30/02 |
| | | | | 706/12 |
| 2011/0225293 | A1* | 9/2011 | Rathod | G06Q 20/384 |
| | | | | 709/224 |
| 2011/0231431 | A1* | 9/2011 | Kamiwada | G06F 16/335 |
| | | | | 707/769 |
| 2013/0046772 | A1* | 2/2013 | Gu | G06Q 30/0282 |
| | | | | 707/751 |
| 2014/0100986 | A1* | 4/2014 | Linden | G06Q 30/0256 |
| | | | | 705/26.7 |
| 2014/0180826 | A1* | 6/2014 | Boal | G06Q 30/0245 |
| | | | | 705/14.66 |
| 2014/0193047 | A1* | 7/2014 | Grosz | G06Q 10/10 |
| | | | | 382/118 |
| 2014/0195921 | A1* | 7/2014 | Grosz | G06Q 30/0601 |
| | | | | 715/738 |
| 2015/0020126 | A1* | 1/2015 | Kegel | H04N 21/6582 |
| | | | | 725/87 |
| 2015/0026001 | A1* | 1/2015 | Gu | G06Q 30/0201 |
| | | | | 705/26.7 |
| 2016/0125080 | A1* | 5/2016 | Glover | G06F 16/951 |
| | | | | 707/706 |
| 2016/0140643 | A1* | 5/2016 | Nice | G06F 16/3344 |
| | | | | 705/26.7 |
| 2016/0283992 | A1* | 9/2016 | Zamer | G06Q 30/0625 |
| 2017/0139517 | A9* | 5/2017 | Morton | G06F 3/04883 |
| 2018/0075010 | A1* | 3/2018 | He | G06F 21/602 |
| 2018/0165590 | A1* | 6/2018 | Vlassis | G06N 5/045 |
| 2020/0065879 | A1* | 2/2020 | Hu | G06K 9/6277 |

FOREIGN PATENT DOCUMENTS

| | | |
|---|---|---|
| CN | 104423621 A | 3/2015 |
| CN | 105045901 A | 11/2015 |

* cited by examiner

RECOMMENDATION METHOD AND DEVICE, A DEVICE FOR FORMULATING RECOMMENDATIONS

CROSS-REFERENCE TO RELATED APPLICATIONS

This application is a national phase entry under 35 U.S.C. § 371 of International Application No. PCT/CN2016/076978, filed on Mar. 22, 2016, which claims the priority of Chinese patent application filed on Dec. 2, 2015 in the Chinese Patent Office with the application number 201510872714.6 and entitled "A Recommendation Method and Device, a Device for Formulating Recommendations", the entire contents of all of which are incorporated herein by reference.

FIELD OF THE DISCLOSURE

The present disclosure generally relates to the field of input method technology and, more particularly, relates to a recommendation method, a recommendation device, and a device for formulating recommendations.

BACKGROUND

Input method refers to an encoding method for inputting various characters into a computer or other device (e.g., a mobile phone or a tablet computer). For users using languages such as Chinese, Japanese, and Korean, it often requires interaction with the computer through an input method program.

In the process of inputting characters provided by the existing input method program, a user may key in an input string through a physical keyboard or a virtual keyboard. Based on a pre-configured and standard-compliant mapping rule, the input string may be converted into candidate entries in a corresponding language, and the candidate entries are displayed for selection. Further, a candidate entry selected by the user is inputted onto the screen.

It can be seen that the existing input method program may only provide the candidate entries corresponding to the user's input string after the user actively keys in the input string. Thus, the character input efficiency is relatively low.

BRIEF SUMMARY OF THE DISCLOSURE

In view of the above problems, the embodiments of the present disclosure have been proposed to provide a recommendation method and a recommendation device, and a device for formulating recommendations, capable of providing candidate entries to the user without any input operation by the user and substantially improving the user's input efficiency.

To solve the above problems, the embodiments of the present disclosure disclose a recommendation method, comprising obtaining a current context of an input method program after the input method program is triggered, analyzing data of past input actions by a current user under past contexts to obtain a target entry matching the current context in the data of the past input actions, and displaying the target entry.

Optionally, the data of the past input actions includes mapping relationships between past screen contents and the past contexts. The step of analyzing the data of the past input actions by the current user under the past context includes searching the mapping relationships between the past screen contents and the past contexts to obtain a target past screen content matching the current context, and obtaining the target entry matching the current context based on the target past screen content.

Optionally, the step of searching the mapping relationships between the past screen contents and the past contexts includes determining a degree of similarity between a past context corresponding to a past screen content and the current context, and selecting the past screen content having the degree of similarity greater than a threshold as the target past screen contents.

Optionally, when a context includes environment information of an application program, the step of determining the degree of similarity between the past context corresponding to the past screen content and the current context includes, based on the environment information of the application program and/or a category of the application program, determining the degree of similarity between a past environment information of the application program and a current environment information of the application program.

Optionally, when a context includes location information, the step of determining the degree of similarity between the past context corresponding to the past screen content and the current context includes, based on the location information and/or a location popularity, determining the degree of similarity between past location information and current location information.

Optionally, when a context includes time information, the step of determining the degree of similarity between the past context corresponding to the past screen content and the current context includes, based on a difference between current time information and past time information, determining the degree of similarity between the past time information and the current time information.

Optionally, the step of obtaining the target entry matching the current context based on the target past screen content includes determining scores of the target past screen contents based on a degree of similarity between the past contexts corresponding to the target past screen contents and the current context and/or a frequency of the target past screen contents, and selecting at least one target past screen content as the target entry according to a descending order of the scores.

Optionally, the step of analyzing the data of the past input actions by the current user under past contexts includes analyzing the past screen contents by the current user under the past contexts to obtain an input pattern, where the input pattern includes a particular screen content under a particular context, and matching the current context with the particular context to obtain the particular screen content matching the current context as the target entry.

Another aspect of the present disclosure provides a computer program including computer readable codes. When being executed on the computer, the computer readable codes implement the disclosed recommendation method.

Another aspect of the present disclosure provides a computer readable medium, storing the disclosed computer program.

Another aspect of the present disclosure provides a recommendation device. The device includes an acquisition module configured to obtaining a current context of an input method program after the input method program is triggered, an analysis module configured to analyze data of past input actions by a current user under past contexts to obtain a target entry matching the current context in the data of the past input actions, and a display module configured to display the target entry.

Another aspect of the present disclosure provides a device for formulating recommendations. The device includes a memory, and one or more programs stored in the memory and configured to be executed by one or more processors to implement obtaining a current context of an input method program after the input method program is triggered, analyzing data of past input actions by a current user under past contexts to obtain a target entry matching the current context in the data of the past input actions, and displaying the target entry.

The embodiments of the present disclosure include the following advantages.

When a user triggers an input method program under a current context and before inputting any characters, the disclosed embodiments may provide target entries matching the current context in data of the past input actions to the user based on an analysis of the data of the past input actions by the current user under various past contexts. Because the target entries matching the current context in the data of the past input actions reflects an input pattern of the user under a past context matching the current context, the disclosed embodiments may recommend the target entries matching the input pattern under the current context to the user, such that the user may directly select a target entry to input to the screen without any input operation by the user. Thus, the disclosed embodiments may provide candidate entries to the user without any input operation by the user, thereby substantially improving the user's input efficiency.

DETAILED DESCRIPTION

The objectives, features, and advantages of the present disclosure will become clearer from the following description of the embodiments of the present disclosure when taken in conjunction with the accompanying drawings.

The existing input method often provides candidate entries in response to a user input string only after a user inputs something. When the user does not key in any input string or anything, no candidate entries may be provided to the user.

In some embodiments, an input action by the user often depends on context. The context may include time (e.g., morning, noon, afternoon, evening, meal time, work day, holiday, etc.), location (e.g., home, work place, restaurant, transit station, etc.), weather, active application program, etc. In other words, through collecting, storing, and analyzing data of past input actions by a user, an input need under a certain context may often be predictable. As such, the data of the past input actions by the current user may be incorporated to proactively provide candidate entries matching the current context, thereby improving the input efficiency.

Thus, the present disclosure provides a recommendation method. The recommendation method is based on the past input actions by a user. The recommendation method records in advance the data of the past input actions by the user under various past contexts. When a user has an input need under a current context and triggers an input method program, the recommendation method may provide the user with target entries matching the current context based on the analysis of the data of the past input actions. Because the target entry matching the current context in the data of the past input actions reflects the user's input pattern and intent under a past context that matches the current context, the recommender method is able to recommend the target entries matching the input pattern under the current context, such that the user may directly select a target entry without any additional input operation. Thus, the recommender method provides selection entries to the user under the circumstance that no user input operation is performed, thereby substantially improving the input efficiency by the user.

Method Embodiment One

Figure 1:
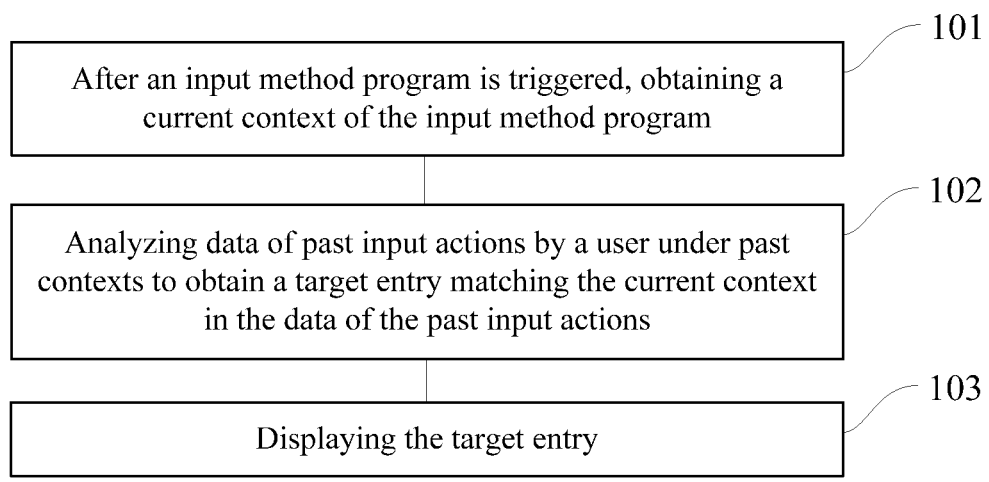
FIG. 1 illustrates a flow chart of the steps in the Embodiment One of an exemplary input method according to the present disclosure.

FIG. 1 illustrates a flow chart of the steps in the Embodiment One of an exemplary input method according to the present disclosure. As shown in FIG. 1, the method may include the following steps.

Step 101: after an input method program is triggered, obtaining a current context of the input method program.

The embodiment of the present disclosure may be applied to computers, tablet computers, mobile phones, and other information equipment loaded with the input method program. When a user intends to input a character, the user may click an input box or perform equivalent triggering operation to launch the input method program in the information equipment. For example, when the user intends to search his or her favorite TV drama "Nirvana in Fire" using Youku APP installed in a tablet computer or mobile phone, the input method program may be triggered by clicking on the search box of Youku APP. In another example, when the user intends to chat with friends using QQ program installed in the computer, the input method program may be triggered by clicking the instant messaging window of the QQ program. It should be understood that the user may trigger the input method program by any triggering methods. The embodiment of the present disclosure does not limit any particular triggering method of the input method program.

In the embodiment of the present disclosure, the context of the input method program may include at least one of time information, location information, application program environment information, or webpage environment information. The time information may be obtained from the clock of the information equipment. The time information may include time of day in hourly intervals. The length of the hourly interval may be one hour or two hours. The starting point of the hourly interval may be on the hour, such as 7 o'clock or in half hour, such as half past 7 o'clock. It should be understood that the embodiment of the present disclosure does not limit the length, starting point, or ending point of the hourly interval. The location information may include GPS (Global Positioning System) information of the information equipment, IP (Internet protocol) information, or location information obtained from a wireless network. For example, the location information may include the user at work place, the user at home, or the user at a subway station, etc. The application program environment information may include the information about the APP (application program) that triggers or launches the input method program, i.e., the APP information that the input method program is pertaining to, such as Youku APP or Baidu Takeout APP. The webpage environment information may include a webpage URL (Uniform Resource Locator), etc.

In addition to time information, location information, application program environment information, and webpage environment information, the context of the embodiment of the present disclosure may also include other environment information, such as air pressure, altitude, temperature, humidity, and other environment information. The embodiment of the present disclosure does not limit contents of the context or methods of obtaining the context.

Step 102: analyzing data of past input actions by a user under past contexts to obtain a target entry matching the current context in the data of the past input actions.

In the embodiment of the present disclosure, the data of the past input actions by the current user under various past contexts may be analyzed to discover an input pattern by the user under a past context matching the current context, such that the target entry matching the input pattern under the current context may be recommended to the user.

In one embodiment, assuming that the context includes a certain APP environment such as Youku APP or Baidu Takeout APP, the target entry may include at least one entry having the highest input frequency of the past screen contents under this APP environment. Or the target entry may include at least one entry having the highest input frequency of the past screen contents under this APP environment in the most recent time interval (such as the most recent week). Or the target entry may include at least one entry having the highest input frequency of the past screen contents under the environment of a certain category of application programs including this APP. The APP categories may be classified by an APP developer and/or an APP administrator, and may include a video and audio category, a fast food category, a social networking category, a map category, a search engine category, a news category, and a web browser category. APPs available on the market may be collected and classified. For example, Youku APP may belong to the video and audio category. Baidu Takeout APP may belong to the fast food category. Sougou Map APP may belong to the map category. For example, the user has recently been watching the TV drama "Nirvana in Fire". Everyday, the user searches new episodes of the TV drama "Nirvana in Fire" in various APPs of the video and audio category. After the user consistently inputs "Nirvana in Fire" for one week, the target entry of "Nirvana in Fire" may be automatically recommended to the user when the user clicks the search box of an APP in the video and audio category.

It should be noted that the embodiment of the present disclosure may continuously collect the user's past screen contents in a recent time period, and may classify the user's past screen contents into various categories through analysis, such as a video and audio category, a fast food category, and a social networking category, etc. Thus, some past screen contents may be recommended to the user as target entries based on the APP category.

In another embodiment, assuming that the context includes the hourly interval, the target entries may include at least one entry having the highest input frequency of the past screen contents under the context of the hourly interval. Or the target entries may include one entry having the highest input frequency of the past screen contents under the context of the most recent time interval (e.g., the most recent week). For example, the user is used to getting up around 7 am every day, and inputs "weather forecast" in a mobile phone browser to query the weather forecast of the day. After the user consecutively inputs "weather forecast" for one week, "weather forecast" may be automatically recommended to the user when the user opens the search box of the mobile phone browser around 7 am every day.

In another embodiment, assuming that the context includes the location information, the target entries may include at least one entry having the highest input frequency of the past screen contents under the context of a particular location. Or the target entries may include at least one entry having the highest input frequency of the past screen contents under the context of the location in the most recent time interval (e.g., the most recent week). For example, the user often meets friends at Wudaokou Hualian. Every time the user arrives at the location, the user habitually announces his or her location to his or her friends using the instant messaging window. After the user consecutively inputs Wudaokou Hualian at the location for a particular time interval, Wudaokou Hualian may be automatically recommended to the user when the user opens the instant messaging window at the location.

It should be noted that, the context for the embodiment of the present disclosure may further include combining two or more categories of various contexts in addition to the APP program environment, hourly interval, or location. That is, the embodiment of the present disclosure may recommend a target entry to the user using two or more contexts combined, thereby achieving a desired recommendation accuracy.

Step 103: displaying the target entry.

In some embodiments, the target entries may be displayed in a format of candidate entries for selection. One or more target entries may be displayed. Each target entry may include a sequence number. The user may directly select a target entry as the screen input using the corresponding sequence number. It should be understood that the embodiment of the present disclosure does not limit the display format of the target entries or the method of selecting the screen input.

In one embodiment, the method of the present disclosure may further include inputting the selected target entry to the screen based on the target entry selection operation by the user. That is, the selection operation may output the corresponding target entry to the application program.

In another embodiment, the method of the present disclosure may further include recording the target entry selection operation and the corresponding context in the data of the past input actions. Thus, the data of the past input actions may be accumulated and updated.

Further, because the target entry matching the current context in the data of the past input actions reflects an input pattern by the user under a past context matching the current context, the method of the present disclosure may recommend to the user the target entries matching the user's input pattern under the current context, such that the user may directly select a target entry as the screen input without additional input operation. Thus, the method of the present disclosure may recommend target entries to the user without any input operation by the user, thereby substantially improving the user's input efficiency.

Method Embodiment Two

Based on the method embodiment one, the method embodiment two provides a detailed description about the process of analyzing the data of the past input actions by a current user under various past contexts.

Figure 2:
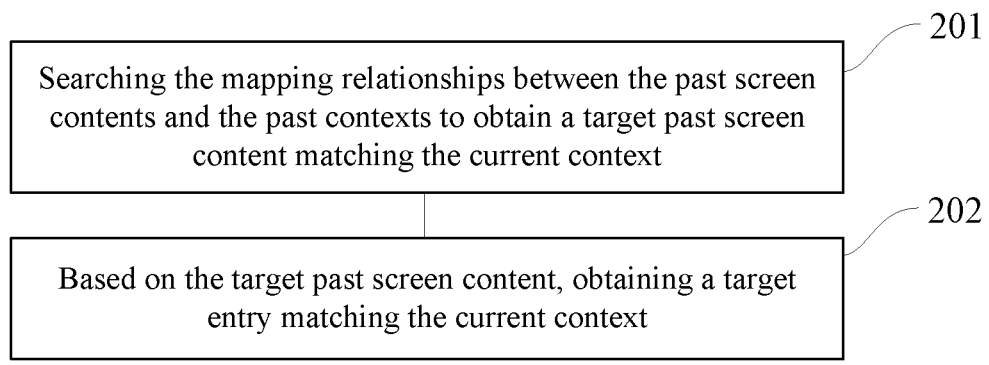
FIG. 2 illustrates a flow chart of an exemplary method of analyzing the data of the past input actions by a current user under various past contexts according to the present disclosure.

FIG. 2 illustrates a flow chart of an exemplary method of analyzing the data of the past input actions by a current user under various past contexts according to the present disclosure. The data of the past input actions may include mapping relationships between past screen contents and past contexts. The analyzing process may include the following steps.

Step 201: searching the mapping relationships between the past screen contents and the past contexts to obtain a target past screen content matching the current context.

Step 202: based on the target past screen content, obtaining a target entry matching the current context.

In practical applications, the searching may include all past screen contents of the current user or the past screen contents of the current user in the most recent time interval. Because the data of the past input actions includes the statistics and accumulation of the user's past input actions and reflects the user's input pattern, the user's input pattern may change when the user's habit changes. Thus, the embodiment of the present disclosure may capture the change by analyzing the past screen contents in the most recent time interval, and may provide the user with target entries matching the user's current input pattern.

In addition, in practical applications, the searching may include all the data or only a portion of the data under the current context. For example, the current context may include current time information, current location information, and current application program environment information. The searching may include the data in the hourly interval corresponding to the current time information to overcome, to a certain extent, the problem of insufficient data due to the substantial limitation by a particular time, a particular location, and a particular APP. Or the searching may include the data in the hourly interval corresponding to the current time information and in the application program category corresponding to the current application program environment to overcome, to a certain extent, the problem of insufficient data due to the substantial limitation by a particular time and a particular APP. It should be understood that the embodiment of the present disclosure does not limit the particular context on which the searching is based.

In one embodiment, the searching in the mapping relationship between the past screen contents and the past contexts may include the following steps.

Step A1: determining a degree of similarity between the past context corresponding to a past screen content and the current context.

Step A2: selecting a past screen content having the degree of similarity greater than a threshold as a target past screen content.

The embodiment of the present disclosure may provide the following determination solutions to determine the degree of similarity between the past context corresponding to the past screen content and the current context.

Determination Solution One

In the determination solution one, the context may include application program environment information. The process of determining the degree of similarity between the past context corresponding to the past screen content and the current context may include determining a degree of similarity between the past application program environment information and the current application program environment information based on the application program environment information and/or the application program category.

In one embodiment, assuming that the past application program environment information and the current application program environment information are the same, the degree of similarity may be about 1. Assuming that the past application program environment information and the current application program environment information are different, but the application program categories of the two application programs are the same, the degree of similarity may be about 0.9. Assuming that the past application program environment information and the current application program environment information are different, and the application program categories of the two application programs are different, the degree of similarity may be about 0.6. For example, the current application program environment information is Youku APP. The application program category of Youku APP is the video and audio category. The instant messaging program does not belong to the video and audio category. Assuming that the user never inputs the entry "Nirvana in Fire" in the environment of a video and audio APP, but inputs such entry in the environment of web browser program and instant messaging program, the degree of similarity between the past application program environment information corresponding to the entry "Nirvana in Fire" and the Youku APP is determined to be about 0.6.

It should be noted that when the past application program environment information and the current application program environment information are different, the application program categories of the two application programs and input frequency of the past screen content may be combined to determine the degree of similarity. When the input frequency of a past screen content satisfies a pre-configured condition, the degree of similarity determined by the application program categories of the two application programs may be assigned with a weight. For example, assuming that the input frequency of the entry "Nirvana in Fire" is greater than a first frequency threshold, the degree of similarity of about 0.6 may be assigned with a pre-configured weight, such as about 1.5.

It should be understood that those skilled in the art may determine the threshold value based on the practical application requirement. For example, when the searching based on the current threshold yields a substantially small number of the target past screen contents, the threshold may be reduced. The embodiment of the present disclosure does not limit the threshold values.

Determination Solution Two

In the determination solution two, the context may include location information. The process of determining the degree of similarity between the past context corresponding to the past screen content and the current context may include determining a degree of similarity between the past location information and the current location information based on the location information and/or the location popularity.

In practical applications, when only the location information is considered, the past location information and the current location information may be compared. When the two locations are close to each other, such as Wudaokou Hualian and Tsinghua Science Park, the two locations are considered to have a high degree of similarity. When the two locations are far away from each other, the two locations are considered to have a low degree of similarity. When both the location information and the location popularity are considered, the degree of similarity determined by the location information may be assigned with a weight determined by the location popularity. For example, the popular locations visited by the user may include work place and home. The two locations may be considered to have a higher location popularity than other less popular locations visited by the user.

Determination Solution Three

In the determination solution three, the context may include time information. The process of determining the degree of similarity between the past context corresponding to the past screen content and the current context may include determining a degree of similarity between the past time information and the current time information based on a difference between the past time information and the current time information. In one embodiment, the degree of similarity between the past time information and the current time information may increase as the difference between the past time information and the current time information decreases. That is, the further apart between the past time information and the current time information, the smaller the degree of similarity between the two time information. The closer between the past time information and the current time information, the greater the degree of similarity between the two time information.

In practical applications, different past time information in the most recent time interval may be considered to have different degrees of similarity with respect to the current time information. Assuming that the time interval is 10 days. The degree of similarity between yesterday and today may be about 1. The degree of similarity between the day before yesterday and today may be about 0.9. The degree of similarity between two days ago and today may be about 0.8. The degree of similarity between ten days ago and today may be about 0.1. It should be understood that the above described degrees of similarity are for illustrative purposes. In practical applications, the degree of similarity between yesterday and today may also be about 20. The degree of similarity between the day before yesterday and today may be about 10. The degree of similarity between two days ago and today may be about 5. That is, the degree of similarity may increase in a pre-configured multiple as the time difference decreases. The embodiment of the present disclosure does not limit the increment manner of the degree of similarity.

The above three determination solutions describe in detail about the process of determining the degree of similarity between the past context corresponding to the past screen content and the current context. It should be understood that the embodiment of the present disclosure may consider using one or more of the three determination solutions based on practical application requirements. When more than one determination solution are considered, multiple target past screen contents may be selected and combined using multiple determinations solutions. Or multiple degrees of similarity determined by multiple determination solutions may be aggregated by applying various weights to obtain one integrated degree of similarity, and the target past screen contents may be selected based on the integrated degree of similarity. Or the three determination solutions may be combined in other ways. The embodiment of the present disclosure does not limit the manner the determination solutions are used.

It should be noted that the above-described process of searching the target past screen contents matching the current context is for illustrative purposes. Based on practical application requirements, those skilled in the art may directly select the past screen contents in the most recent time interval as the target past screen contents, or select the past screen contents having an input frequency greater than a second frequency threshold in the most recent time interval as the target past screen contents. The embodiment of the present disclosure does not limit any particular process of selecting the target past screen contents.

In one embodiment, when the number of the target past screen contents is substantially small, the process of obtaining the target entries matching the current context based on the target past screen contents may directly use the target past screen contents as the target entries.

In another embodiment, when the number of the target past screen contents is substantially large, the target entries matching the user's input pattern may be obtained through a screening process. Accordingly, the process of obtaining the target entries matching the current context based on the target past screen contents may include the following steps.

Step B1: based on the degree of similarity between the past context corresponding to a target past screen content and the current context, and/or the input frequency of the target past screen content, determining a score of the target past screen content.

Step B2: based on the descending order of the scores, selecting at least one target past screen content as the target entries.

When the degrees of similarity and the input frequencies of the target past screen contents are used to sort the target past screen contents, the input frequencies of the target past screen content in various time intervals within a day may be assigned with various weights based on the degrees of similarity, and the input frequencies of the target past screen content in a daily interval may be aggregated by multiplying the weights to the input frequencies of the target past screen content in various time intervals within the day.

For example, the target past screen content may be "Nirvana in Fire". Assuming that a user inputs the entry "Nirvana in Fire" every day in the most recent ten days. The degree of the similarity between yesterday and today may be about 1. The degree of similarity between the day before yesterday and today may be about 0.9. The degree of similarity between two days ago and today may be about 0.8. The degree of similarity between ten days ago and today may be about 0.1. The entry was inputted twice (in a particular time interval during the day and at a particular location) ten days ago, and once every day for the rest of the ten-day interval. The weighted calculation of the score for the entry may be $1*1+0.9*1+0.8*1+0.7*1+0.6*1+0.5*1+0.4*1+0.3*1+0.2*1+0.1*2=5.6$. It should be understood that the weighted calculation is for illustrative purposes. In practical applications, the embodiment of the present disclosure does not limit any particular process of determining the score of the target past screen content.

Assuming that, in addition to the entry "Nirvana in Fire", the target past screen contents may also include an entry "The Journey of Flower" and an entry "Downton Abbey". These two entries may be subject to the same weighted calculation process as for the entry "Nirvana in Fire" to calculate the corresponding scores. After the scores of all the entries are calculated and sorted, the target past screen content having the highest score may be selected as the target entries.

Further, only the integration process of combining the degree of similarity between the past time information and the current time information, and the input frequency of the target past screen content is described in the embodiments of the present disclosure. In practical applications, both the degree of similarity between the past location information and the current location information and the degree of similarity between the past application program environment information and the current application program environment information may be combined with the input frequency of the target past screen content. Or the degree of similarity between the past time information and the current time information, the degree of similarity between the past location information and the current location information, and the degree of similarity between the past application program environment information and the current application program environment information may be combined. The embodiment of the present disclosure does not limit any particular integration process.

Method Embodiment Three

Based on the method embodiment one, the method embodiment three provides a detailed description about the process of analyzing the data of the past input actions by a current user under various past contexts.

Figure 3:
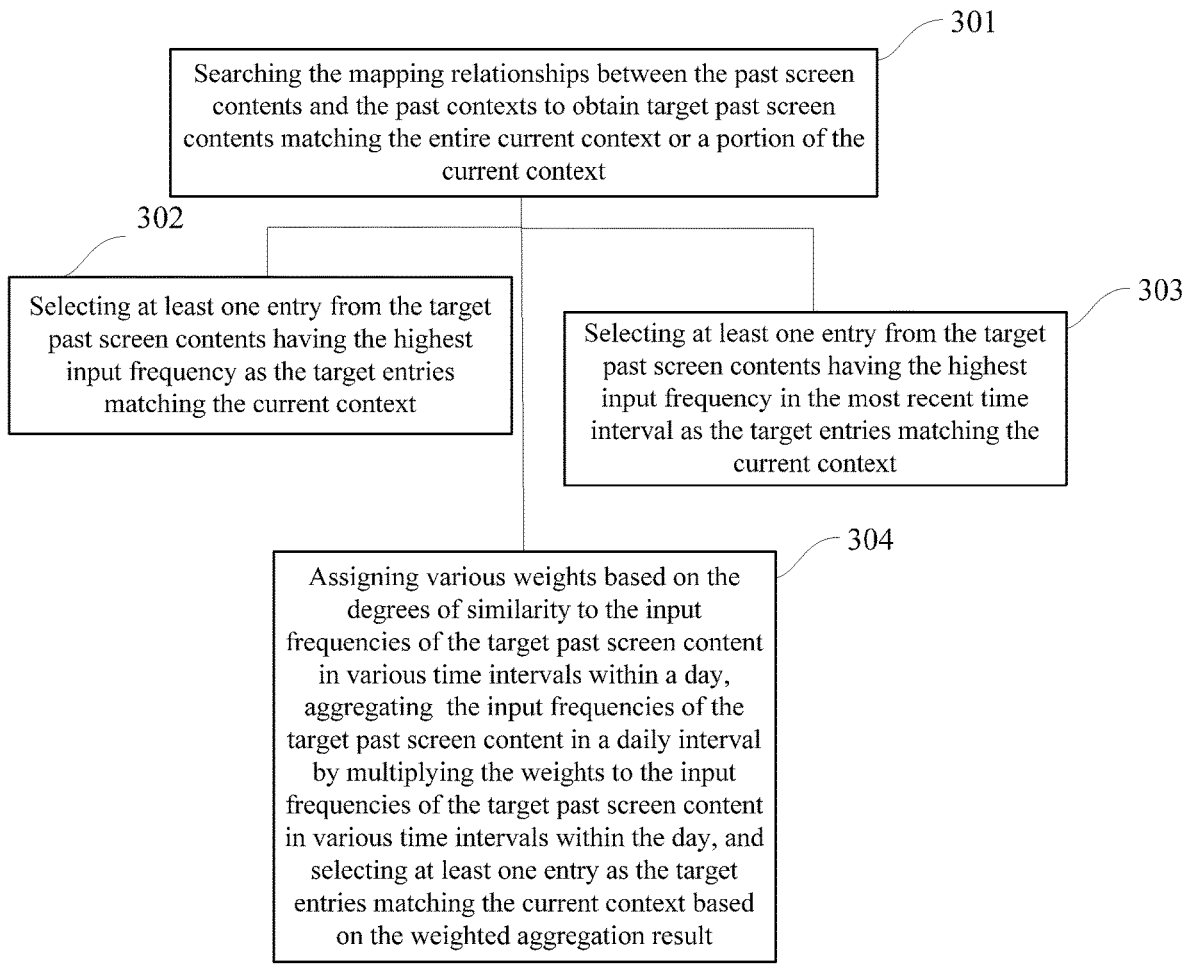
FIG. 3 illustrates a flow chart of another exemplary method of analyzing the data of the past input actions by a current user under various past contexts according to the present disclosure.

FIG. 3 illustrates a flow chart of another exemplary method of analyzing the data of the past input actions by a current user under various past contexts according to the present disclosure. The data of the past input actions may include a mapping relationship between a past screen content and a past context. The analyzing process may include the following steps.

Step 301: searching the mapping relationships between the past screen contents and the past contexts to obtain target past screen contents matching the entire current context or a portion of the current context.

Step 302: selecting at least one entry from the target past screen contents having the highest input frequency as the target entries matching the current context.

Step 303: selecting at least one entry from the target past screen contents having the highest input frequency in the most recent time interval as the target entries matching the current context.

Step 304: assigning various weights based on the degrees of similarity to the input frequencies of the target past screen content in various time intervals within a day, aggregating the input frequencies of the target past screen content in a daily interval by multiplying the weights to the input frequencies of the target past screen content in various time intervals within the day, and selecting at least one entry as the target entries matching the current context based on the weighted aggregation result.

The steps 302, 303, and 304 may be executed in parallel. Those skilled in the art may decide to execute any one or a combination of the three steps according to practical application requirements.

Method Embodiment Four

Based on the method embodiment one, the method embodiment four provides a detailed description about the process of analyzing the data of the past input actions by a current user under various past contexts.

Figure 4:
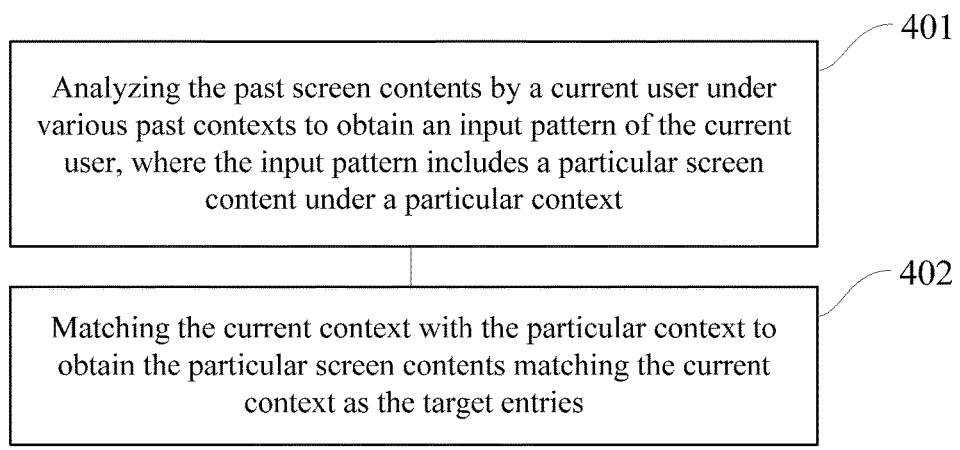
FIG. 4 illustrates a flow chart of another exemplary method of analyzing the data of the past input actions by a current user under various past contexts according to the present disclosure.

FIG. 4 illustrates a flow chart of another exemplary method of analyzing the data of the past input actions by a current user under various past contexts according to the present disclosure. The analyzing process may include the following steps.

Step 401: analyzing the past screen contents by a current user under various past contexts to obtain an input pattern of the current user, where the input pattern includes a particular screen content under a particular context.

Step 402: matching the current context with the particular context to obtain the particular screen contents matching the current context as the target entries.

In the process of analyzing and obtaining the input pattern of the current user, a first analysis may be performed on the past screen contents in the most recent time interval to obtain at least one first past screen content having the highest input frequency. Then, a second analysis may be performed on the past contexts corresponding to the at least one first past screen content having the highest input frequency to obtain a distribution pattern of the past contexts corresponding to the first past screen content. Or a third analysis may be performed on the past screen contents in the most recent time interval under a particular APP environment and/or a particular hourly interval environment to obtain at least one second past screen content having the highest input frequency. Then, the second past screen content may be directly determined to be as the particular screen content corresponding to the particular APP environment and/or the particular hourly interval environment. It should be understood that the embodiment of the present disclosure does not limit any particular process of analyzing and obtaining the input pattern of the current user.

To make those skilled in the art better understand the embodiments of the present disclosure, a plurality of application examples are given below to illustrate the recommendation method.

Application Example One

A user A lives in a xx community in the past few days. When getting up around 7 am at home, the user A may open Youku APP on the mobile phone to search the recently watched TV drama "Nirvana in Fire", and may download the newly updated episodes of "Nirvana in Fire" to watch later on the subway.

The embodiment of the present disclosure may analyze the data of the past input actions by the user A under various past contexts to obtain the above input pattern by the user A. That is, the particular screen content under the particular context by the user A includes the xx community (location information), around 7 am (hourly interval information), Youku APP (APP environment), and the particular screen content "Nirvana in Fire".

Thus, when the user A opens Youku APP and triggers the input method program to prepare to input contents at the xx community between 6 am and 8 am, the current context may be used to match the above particular context. Because the degree of similarity between the current context and the above particular context is substantially high, the particular screen content "Nirvana in Fire" and other screen contents frequently inputted in Youku APP by the user A may be recommended to the user A, such that the user A may directly select a desired input content from the recommended contents.

Application Example Two

A user B often opens Baidu Takeout APP around 11:30 am during work days to search fast food restaurants, such as "Heweifang" and "Hometown Meatloaf", near the work place, and to place online orders.

The embodiment of the present disclosure may analyze the data of the past input actions by the user B under various past contexts to obtain the above input pattern by the user B. That is, the particular screen content under the particular context by the user B includes the work place (location information), around 11:30 am during work days (hourly interval information), Baidu Takeout APP (APP environment), and the particular screen contents "Heweifang" and "Hometown Meatloaf".

Thus, when the user B is at the work place during the work days, opens Baidu Takeout APP, Hungry APP, or other fast food restaurant APP between 11 am and 12 pm, and launches the input method program to prepare to input contents, the embodiment of the present disclosure may recommend to the user B the entries such as "Heweifang", "Hometown Meatloaf", or other relevant entry as selections, such that the user B may directly select a desired input content from the selections entries.

Application Example Three

When the user's input pattern changes with the accumulation and updates of the user's past input actions, the embodiment of the present disclosure may capture the changes by analyzing the past screen contents in the most recent time interval, thereby providing target entries reflecting the current input pattern.

The application example one is used for illustrative purposes. Assuming that the user A inputted the entry "Nirvana in Fire" from the first day through the tenth day, the entry "Love Yunge from the Desert" on the eleventh day, and the entry "Love Yunge from the Desert" on the twelfth day.

Then, based on the degree of similarity between the past context corresponding to the target past screen content and the current context and/or frequency of the target past screen content as described in the step B1, in the process of scoring the target past screen contents, the degree of similarity between the past time information and the current time information for the entry "Nirvana in Fire" may decrease as time goes by while the degree of similarity between the past time information and the current time information for the entry "Love Yunge from the Desert" may increase as time goes by. Thus, the score of the entry "Love Yunge from the Desert" may gradually exceed the score of the entry "Nirvana in Fire". When the target entry changes from the entry "Nirvana in Fire" having the highest original score to the entry "Love Yunge from the Desert" having the highest current score, the entry "Love Yunge from the Desert" having the highest current score may be recommended to the user. Or when a plurality of target entries are recommended to the user by the input method, the top entry may change from the entry "Nirvana in Fire" to the entry "Love Yunge from the Desert" having the highest current score.

Further, the embodiment of the present disclosure may analyze the past data to obtain the user's input pattern, and may directly recommend entries matching the input pattern to the user under a particular time, a particular location, and a particular APP environment. The user may directly select from the candidate entries as desired inputs. Thus, the input actions by the user may be reduced and the user experience may be improved.

While the application example one through the application example three are suitable for mobile phone applications, the application example four and the application example five may be suitable for PC terminal applications. The process of the recommendation method for PC terminals may include the following steps.

Step S1: based on environments of various application programs, analyzing the data of the past input actions by a user to obtain a particular screen content of the user under a particular context.

Step S2: launching a certain application program, such as QQ, by the user, and triggering the input method program.

Step S3: without any user input, directly providing candidate entries matching the current context through the input method program.

Step S4: directly selecting a particular entry from the candidate entries by the user, or viewing more entries by performing a page-turn operation.

Application Example Four

When a user C opens QQ program without inputting anything, the input method program may directly pop up an input selection box to recommend to the user C entries such as "1. Hello, 2. Good Morning, 3. Are you there? 4. What are you doing?" The user C may directly select the top entry by pressing the space bar, select a particular entry by pressing a digit key, or view more entries by performing a page-turn operation.

Application Example Five

When a user D opens Outlook and creates a new e-mail without inputting anything, the input method program may directly recommend to the user D entries such as "1. Yang Ge, 2. Zhang Yang, 3. Boss Jian, 4. Hello, 5. Dear." The user D may select the top entry by pressing the space bar, a particular entry by pressing a digit key, or view more entries by performing a page-turn operation.

Application Example Six

While the application example one through the application example five are suitable for time environment, location environment, or APP program environment, the application example six may be suitable for webpage environment.

When a user inputs contents on various webpages, the input method program may obtain the user's web address, analyze the data of the user's past input actions on various webpages, and learn the user's input pattern on various webpages. Thus, a particular screen content may be obtained when the user browses a particular webpage. As such, when the user opens the corresponding webpage, brings up the corresponding input box, and triggers the input method program, based on the user's web address, the input method program may recommend candidate entries to the user accordingly. The user may directly click a corresponding entry to input to the screen or view more entries by performing a page-turn operation.

For example, when a user E arrives at his or her work place in the morning and loads Baidu homepage on the browser of his or her computer, without any input and based on the user E's input pattern, the input method program may recommend to the user E entries such as Beijing weather, 36 kr, and calendar, etc.

It should be noted that, for the convenience of illustrations, the method embodiments are described as a series of action combinations. However, those skilled in the art should understand that the embodiments of the present disclosure do not limit the order of the action combinations as described. Certain steps in various embodiments may be executed in different orders or executed concurrently. Further, those skilled in the art should understand that various embodiments described in the specification are optional and the described actions are not necessarily required by the embodiments of the present disclosure.

Device Embodiment

Figure 5:
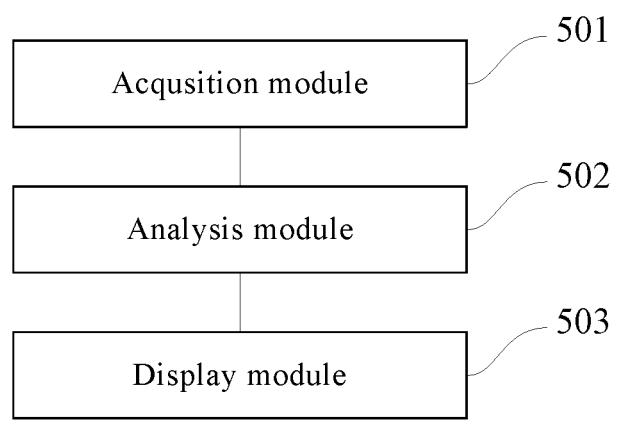
FIG. 5 illustrates a block diagram of an exemplary recommendation device according to the present disclosure.

FIG. 5 illustrates a block diagram of an exemplary recommendation device according to the present disclosure. As shown in FIG. 5, the recommendation device may include the following modules.

Acquisition module 501: configured to obtain a current context of an input method program after the input method program is triggered.

Analysis module 502: configured to analyze data of past input actions by a current user under past contexts to obtain a target entry matching the current context in the data of the past input actions.

Display module 503: configured to display the target entry.

In one embodiment, the data of the past input actions may include a mapping relationship between a past screen content and a past context.

The analysis module 502 may include the following sub-modules.

Search sub-module: configured to search the mapping relationships between the past screen contents and the past contexts to obtain target past screen contents matching the current context.

Obtaining sub-module: configured to obtain target entries matching the current context based on the target past screen contents.

In another embodiment, the search sub-module may include the following units.

Determination unit: configured to determine a degree of similarity between the past context corresponding to a past screen content and the current context.

Screening unit: configured to screen out past screen contents having the degree of similarity greater than a threshold as target past screen contents.

In another embodiment, the context may include application program environment information. Then, the determination unit may include the following sub-unit.

First determination sub-unit: configured to determine a degree of similarity between past application program environment information and current application program environment information based on the application program environment information and/or the application program category.

In another embodiment, the context may include location information. Then, the determination unit may include the following sub-unit.

Second determination sub-unit: configured to determine a degree of similarity between past location information and current location information based on the location information and/or the location popularity.

In another embodiment, the context may include time information. Then, the determination unit may include the following sub-unit.

Third determination sub-unit: configured to determine a degree of similarity between past time information and current time information based on a difference between the past time information and the current time information.

In another embodiment, the obtaining sub-module may include the following units.

Score determination unit: configured to determine a score of a target past screen content based on the degree of similarity between the past context corresponding to the target past screen content and the current context, and/or the frequency of the target past screen content.

Selection unit: configured to select at least one target past screen content as target entries based on the descending order of the scores.

In another embodiment, the analysis module 502 may include the following sub-modules.

First analysis sub-module: configured to analyze the current user's past screen contents under various past contexts to obtain a current user's input pattern. The input pattern may include a particular screen content under a particular context.

Matching sub-module: configured to match the current context with a particular context to obtain a particular screen content matching the current context as target entries.

Because the device embodiment is similar to the method embodiments, the description is relatively simple. Certain counterparts of the description of the method embodiments may be referenced for more detailed description of the device embodiment.

Various embodiments of the present disclosure are described in a progressive manner. Each embodiment focuses on the differences from other embodiments. The same or similar parts among various embodiments can be referred to each other.

The methods of operation for the modules, sub-modules, units, and sub-units of the device embodiment are described in detail in various method embodiments, and are not duplicated.

Figure 6:
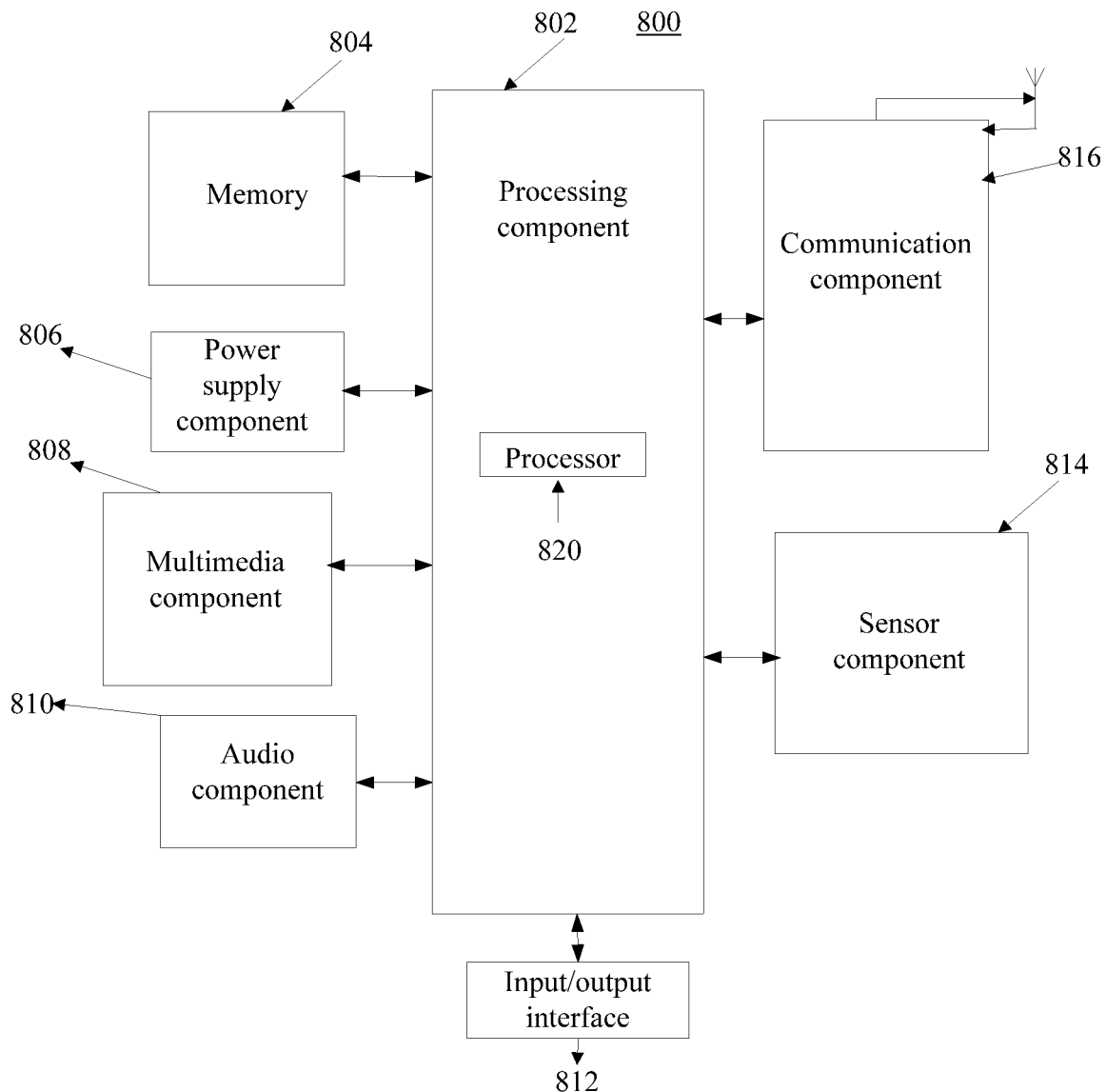
FIG. 6 illustrates a block diagram of an exemplary device for formulating recommendations according to the present disclosure.

FIG. 6 illustrates a block diagram of an exemplary device for formulating recommendations according to the present disclosure. As shown in FIG. 6, the device 800 may be a mobile phone, a computer, a digital media terminal, a message receiving equipment, a gaming platform, a tablet equipment, a medical equipment, a fitness equipment, or a personal digital assistant, etc.

Referring to FIG. 6, the device 800 includes one or more of a processing component 802, a memory 804, a power supply component 806, a multimedia component 808, an audio component 810, an input/output (I/O) interface 812, a sensor component 814, and a communication component 816.

The processing component 802 often controls the overall operation of the device 800, such as display, phone calls, data communication, camera operation, and operation logs. The processing component 802 may include one or more processors 820 to execute instructions for all or a portion of the steps of the method. In addition, the processing component 802 may include one or more modules for interactions between the processing component 802 and other components. For example, the processing components 802 may include a multimedia module for interactions between the processing component 802 and the multimedia component 808.

The memory 804 may be configured to store various types of data to support the operation of the device 800. For example, the data may include any application programs or instructions implementing the method operated on the device 800, contact data, phone data, messages, pictures, and videos, etc. The memory 804 may be any type of volatile or non-volatile memory devices or a combination of both memory devices, such as static random access memory (SRAM), electrically erasable programmable read-only memory (EEPROM), erasable programmable read-only memory (EPROM), programmable read-only memory (PROM), read-only memory (ROM), magnetic memory, flash memory, hard disk, or optical disk.

The power supply component 806 may provide power supply to various components of the device 800. The power supply component 806 may include a power supply management system, one or more power supplies, and other components related to the generation, management, and distribution of electric power for the device 800.

The multimedia component 808 may include a screen for providing an output interface between the device 800 and the user. In some embodiments, the screen may include a liquid crystal display (LCD) and a touch panel (TP). When the screen includes the touch panel, the screen may be a touch screen to receive input signals from the user. The touch panel may include one or more touch sensors to sense touches, slides, and other finger postures on the touch panel. The touch sensor may not only sense the boundary of the touch or slide, but also detect the duration and pressure related to the touch or slide operation. In some embodiments, the multimedia component 808 may include one front camera and/or a rear camera. When the device 800 is in an operation mode such as a photograph mode or a video mode, the front camera and/or the rear camera may receive external multimedia data. Each of the front camera and the rear camera may include a fixed or variable focus optical lens system.

The audio component 810 may be configured to output and/or input audio signals. For example, the audio component 810 may include a microphone (MIC). When device 800 is in an operation mode such as a calling mode, a recording mode, and voice recognition mode, the microphone may be configured to receive external audio signals. The received audio signals may be further stored in the memory 804 or may be transmitted by the communication component 816. In some embodiments, the audio component 810 may also include a speaker for outputting audio signals.

The I/O interface 812 may provide interfaces between the processing component 802 and peripheral interface modules. The peripheral interface modules may include a keyboard, a clicking wheel, and a button, etc. The button may not be limited to a main menu button, a volume button, a start button, and a lock button.

The sensor component 814 may include one or more sensors to provide status evaluation of various aspects of the device 800. For example, the sensor component 814 may detect open/close status of the device 800, and relative positions of the components, such as a display and a keyboard of the device 800. The sensor component 814 may detect a change of the position of the device 800 or a component of the device 800, a presence or absence of a user's touch on the device 800, a location or acceleration/de-acceleration of the device 800, and a change of the temperature of the device 800. The sensor component 814 may include a proximity sensor to detect presence of any nearby object without any physical contact. The sensor component 814 may include a photo sensor, such as CMOS or CCD image sensor, in imaging applications. In some embodiments, the sensor component 814 may also include an acceleration sensor, a gyro sensor, a magnetic sensor, a pressure sensor, or a humidity sensor.

The communication component 816 may be configured to provide wired or wireless communication between the device 800 and other equipment. The device 800 may access a communication standard based wireless network, such as WiFi, 2G or 3G, or a combination thereof. In one embodiment, the communication component 816 may receive broadcast signals or broadcast related signals of an external broadcast management system through a broadcast signal channel. In one embodiment, the communication component 816 may also include a near field communication (NFC) module to facilitate short range communications. For example, the NFC module may include a radio frequency identification (RFID) technology, an infrared data association (IrDA) technology, an ultra-wideband (UWB) technology, a Bluetooth (BT) technology, and other technologies.

In some embodiments, the device 800 may include one or more of an application specific integrated circuit (ASIC), a digital signal processor (DSP), a digital signal processing device (DSPD), a programmable logic array (PLD), a field programmable gate array (FPGA), a controller, a microcontroller, a microprocessor, or other electronic components to execute the method.

In some embodiments, the device 800 may include an instruction-storing non-volatile computer readable storage medium, such as the instruction-storing memory 804. The instructions may be executed by the processors 820 of the device 800 to implement the method. For example, the non-volatile computer readable storage medium may include a read-only memory (ROM), a random access memory (RAM), a CD-ROM, a magnetic tape, a floppy disk, and an optical data storage device.

When the instructions stored in a non-volatile computer readable storage medium are executed by a processor of a mobile terminal, the storage medium may facilitate the mobile terminal to execute a recommendation method. The method may include obtaining a current context of an input method program when the input method program is triggered, analyzing the data of the past input actions by a current user under various past contexts to obtain target entries matching the current context in the data of the past input actions, and displaying the target entries.

Figure 7:
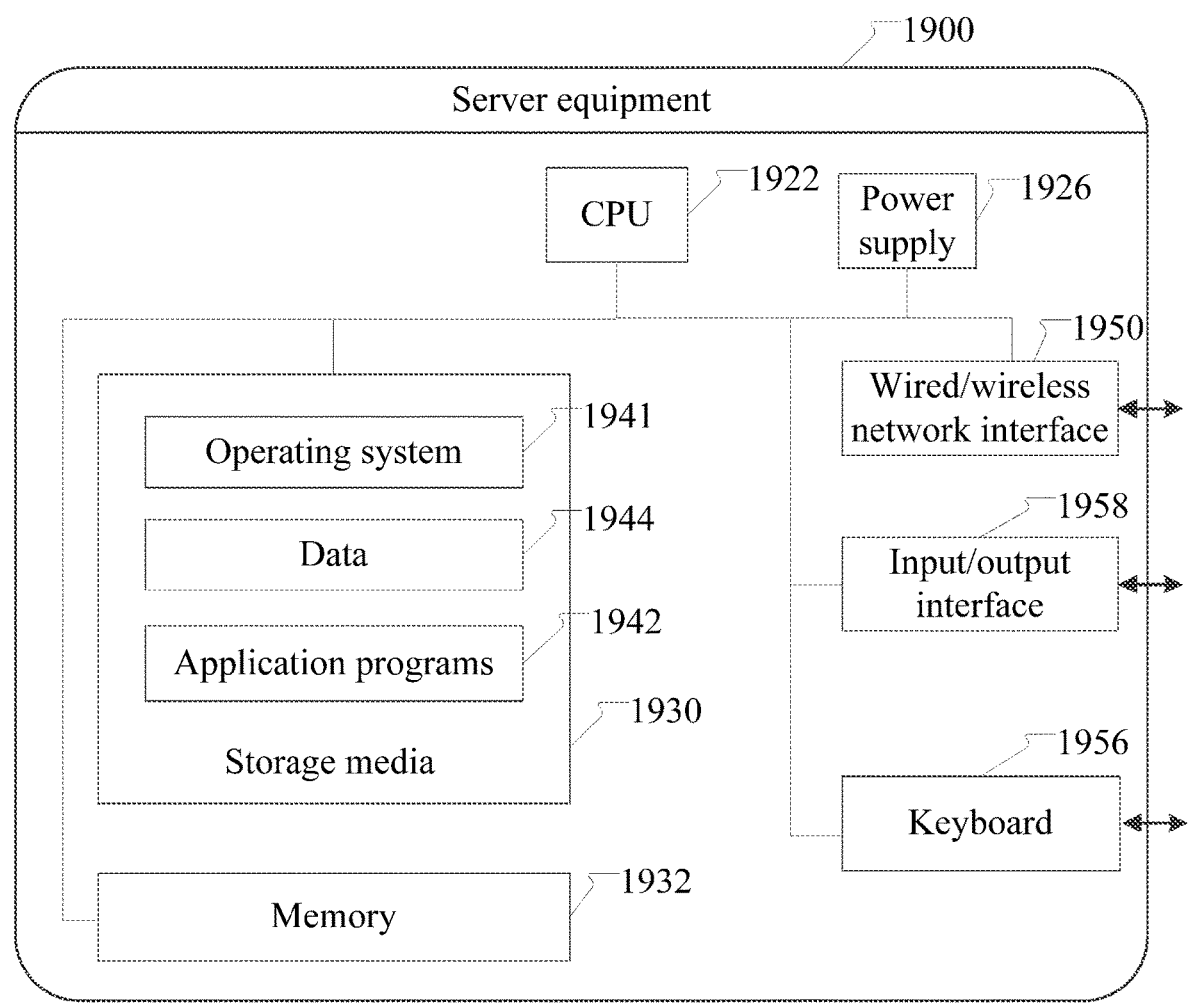
FIG. 7 illustrates a schematic diagram of an exemplary server according to the present disclosure.

FIG. 7 illustrates a schematic diagram of an exemplary server according to the present disclosure. As shown in FIG. 7, substantially varied in configurations and performances, the server 1900 may include one or more central processing units (CPU) 1922 (e.g., one or more processors), a memory 1932, and one or more storage media 1930 (e.g., one or more mass storage devices) storing application programs 1942 or data 1944. The memory 1932 and the storage media 1930 may be a temporary storage or a persistent storage. The application programs stored in the storage media 1930 may include one or more modules (not shown). Each module may include a series of instruction operations in the server. Further, in the server 1900, the central processing unit 1922 may be configured to communicate with the storage media 1930 and execute a series of instruction operations in the storage media 1930.

The server 1900 may also include one or more power supplies 1926, one or more wired or wireless network interfaces 1950, one or more input output interfaces 1958, one or more keyboards 1956, and/or one or more operating systems 1941, such as Windows Server™, Mac OS X™, Unix™, Linux™, and FreeBSD™, etc.

Those skilled in the art will readily recognize other embodiments of the present application upon consideration of the specification and practice of the invention disclosed herein. This application is intended to cover any variations, uses, or adaptations of the present application, which follow the general principles of the application and include common knowledge or conventional techniques in the technical field not disclosed in the present disclosure. The description and examples are to be considered exemplary only, with the true scope and spirit of the application being indicated by the following claims.

It should be understood that the present application is not limited to the precise structure that has been described above and shown in the drawings, and various modifications and changes can be made without departing from the scope thereof. The scope of this application is limited only by the attached claims.

The foregoing descriptions are merely preferred embodiments of the present application and are not intended to limit the present application. Any modification, equivalent replacement, or improvement made within the spirit and principle of the present application shall be included in the protection of the present application.

The foregoing provides a detailed description of a recommendation method, a recommendation device, and a device for formulating recommendations provided by the present disclosure. Specific examples are used in the present disclosure to explain the principle and implementation manners of the disclosure. The description of the foregoing embodiments is only for helping to understand the method and its core idea of the present disclosure. At the same time, those skilled in the art will change the specific implementation manner and application range according to the idea of the present disclosure. The contents of this specification should not be construed as limiting the present application.

What is claimed is:

1. A recommendation method applied to a computing device, comprising:
   detecting a triggering operation to launch an input method program within an application program, the triggering operation being a user selection on an input box of the application program;
   in response to the triggering operation, obtaining a current context of the input method program, the current context including at least one of environment information of the application program, time information, or location information of the computing device;
   analyzing data of past input actions by a current user under past contexts to obtain at least one target entry matching the current context in the data of the past input actions, comprising:
      searching mapping relationships between past screen contents and past contexts to obtain a target past screen content matching the current context; and
      based on the target past screen content, obtaining the at least one target entry matching the current context;
   displaying the target entry as a candidate entry of the input method program before the input method program receives any character entered by a user; and
   in response to the target entry being selected, outputting, by the input method program, the target entry to the input box of the application program.

2. The method according to claim 1, wherein the step of searching the mapping relationships between the past screen contents and the past contexts includes:
   determining a degree of similarity between a past context corresponding to a past screen content and the current context; and
   selecting the past screen content having the degree of similarity greater than a threshold as the target past screen contents.

3. The method according to claim 2, wherein:
   when the current context includes the environment information of the application program, the step of determining the degree of similarity between the past context corresponding to the past screen content and the current context includes:
      based on the environment information of the application program and/or a category of the application program, determining the degree of similarity between a past environment information of the application program and a current environment information of the application program.

4. The method according to claim 2, wherein:
   when the current context includes the location information, the step of determining the degree of similarity between the past context corresponding to the past screen content and the current context includes:
      based on the location information and/or a location popularity, determining the degree of similarity between past location information and current location information.

5. The method according to claim 2, wherein:
   when the current context includes the time information, the step of determining the degree of similarity between the past context corresponding to the past screen content and the current context includes:
      based on a difference between current time information and past time information, determining the degree of similarity between the past time information and the current time information.

6. The method according to claim 1, wherein:
   the step of obtaining the at least one target entry matching the current context based on the target past screen content includes:
      based on a degree of similarity between the past contexts corresponding to the target past screen contents and the current context and/or a frequency of the target past screen contents, determining scores of the target past screen contents; and
      according to a descending order of the scores, selecting at least one target past screen content as the at least one target entry.

7. The method according to claim 1, wherein the step of analyzing the data of the past input actions by the current user under past contexts includes:
   analyzing the past screen contents by the current user under the past contexts to obtain an input pattern, wherein the input pattern includes a particular screen content under a particular context; and
   matching the current context with the particular context to obtain the particular screen content matching the current context as the at least one target entry.

8. A non-transitory computer readable medium, storing computer-executable instructions executable by at least one processor of a computing device to perform:
   detecting a triggering operation to launch an input method program within an application program, the triggering operation being a user selection on an input box of the application program;
   in response to the triggering operation, obtaining a current context of the input method program, the current context including at least one of environment information of the application program, time information, or location information of the computing device;
   analyzing data of past input actions by a current user under past contexts to obtain at least one target entry matching the current context in the data of the past input actions, comprising:
      searching mapping relationships between past screen contents and past contexts to obtain a target past screen content matching the current context; and
      based on the target past screen content, obtaining the at least one target entry matching the current context;
   displaying the target entry as a candidate entry of the input method program before the input method program receives any character entered by a user; and in response to the target entry being selected, outputting, by the input method program, the target entry to the input box of the application program.

9. A device for formulating recommendations, comprising:
   a memory; and
   one or more programs stored in the memory and configured to be executed by one or more processors to implement:
     detecting a triggering operation to launch an input method program within an application program, the triggering operation being a user selection on an input box of the application program;
     in response to the triggering operation, obtaining a current context of the input method program, the current context including at least one of environment information of the application program, time information, or location information of the device;
     analyzing data of past input actions by a current user under past contexts to obtain at least one target entry matching the current context in the data of the past input actions, comprising:
       searching mapping relationships between past screen contents and past contexts to obtain a target past screen content matching the current context; and
       based on the target past screen content, obtaining the at least one target entry matching the current context;
     displaying the target entry as a candidate entry of the input method program before the input method program receives any character entered by a user; and
     in response to the target entry being selected, outputting, by the input method program, the target entry to the input box of the application program.

10. The device according to claim 9, wherein searching the mapping relationships between the past screen contents and the past contexts comprises:
    determining a degree of similarity between a past context corresponding to a past screen content and the current context; and
    selecting the past screen content having the degree of similarity greater than a threshold as the target past screen contents.

11. The device according to claim 10, wherein:
    when the current context includes the environment information of the application program, determining the degree of similarity between the past context corresponding to the past screen content and the current context comprises:
       based on the environment information of the application program and/or a category of the application program, determining the degree of similarity between a past environment information of the application program and a current environment information of the application program.

12. The device according to claim 10, wherein:
    when the current context includes the location information, the step of determining the degree of similarity between the past context corresponding to the past screen content and the current context comprises:
       based on the location information and/or a location popularity, determining the degree of similarity between past location information and current location information.

13. The device according to claim 10, wherein:
    when the current context includes the time information, determining the degree of similarity between the past context corresponding to the past screen content and the current context comprises:
       based on a difference between current time information and past time information, determining the degree of similarity between the past time information and the current time information.

14. The device according to claim 9, wherein: obtaining the at least one target entry matching the current context based on the target past screen content comprises:
    based on a degree of similarity between the past contexts corresponding to the target past screen contents and the current context and/or a frequency of the target past screen contents, determining scores of the target past screen contents; and
    according to a descending order of the scores, selecting at least one target past screen content as the at least one target entry.

15. The device according to claim 9, wherein analyzing the data of the past input actions by the current user under past contexts comprises:
    analyzing the past screen contents by the current user under the past contexts to obtain an input pattern, wherein the input pattern includes a particular screen content under a particular context; and
    matching the current context with the particular context to obtain the particular screen content matching the current context as the at least one target entry.

* * * * *